US011358478B2

(12) United States Patent
Sussna et al.

(10) Patent No.: US 11,358,478 B2
(45) Date of Patent: Jun. 14, 2022

(54) LIGHT ELECTRIC VEHICLE WITH DYNAMIC GEAR RATIO SELECTION FEATURE

(71) Applicant: Uber Technologies, Inc, San Francisco, CA (US)

(72) Inventors: Daniel Andrew Sussna, San Francisco, CA (US); Ashley Cooper, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 218 days.

(21) Appl. No.: 16/662,973

(22) Filed: Oct. 24, 2019

(65) Prior Publication Data

US 2021/0023952 A1 Jan. 28, 2021

Related U.S. Application Data

(60) Provisional application No. 62/878,470, filed on Jul. 25, 2019.

(51) Int. Cl.
*B60L 15/20* (2006.01)
*B60L 58/12* (2019.01)
*B62J 99/00* (2020.01)
*B60L 53/80* (2019.01)
*B62J 45/20* (2020.01)
*B62J 45/40* (2020.01)
*B62J 50/20* (2020.01)

(52) U.S. Cl.
CPC ............ *B60L 15/2045* (2013.01); *B60L 58/12* (2019.02); *B62J 99/00* (2013.01); *B60L 53/80* (2019.02); *B60L 2240/62* (2013.01); *B60L 2240/64* (2013.01); *B60L 2250/18* (2013.01); *B60L 2250/20* (2013.01); *B60L 2250/26* (2013.01); *B62J 45/20* (2020.02); *B62J 45/40* (2020.02); *B62J 50/20* (2020.02)

(58) Field of Classification Search
None
See application file for complete search history.

(56) References Cited

U.S. PATENT DOCUMENTS

2020/0014322 A1\* 1/2020 Kondo .................... B62M 6/40

\* cited by examiner

*Primary Examiner* — Todd Melton
(74) *Attorney, Agent, or Firm* — Dority & Manning, P.A.

(57) ABSTRACT

The present disclosure describes a system for determining an optimal gear ratio for a light electric vehicle. The optimal gear ratio may be based on an anticipated or current route of an individual riding the light electric vehicle, riding habits of the individual and/or on maintenance status information associated with the light electric vehicle. When the optimal gear ratio is determined, the system provides an indication of the optimal gear ratio to the light electric vehicle.

20 Claims, 9 Drawing Sheets

LIGHT ELECTRIC VEHICLE WITH DYNAMIC GEAR RATIO SELECTION FEATURE

CROSS-REFERENCE TO RELATED APPLICATIONS

This application claims priority to U.S. Provisional Application No. 62/878,470, titled "Shifting Feature for Electric Vehicles," filed on Jul. 25, 2019. The entire disclosure of which is hereby incorporated by reference in its entirety.

BACKGROUND

Electric vehicles, such as electric scooters and electric bicycles, are typically available for individuals to reserve and ride for a period of time. However, each individual typically has their own riding style and riding preferences.

SUMMARY

The present disclosure describes a shift feature for light electric vehicles. As will be explained in greater detail below, the shift feature may be used to inform individual riders and/or a light electric vehicle of an optimal gear ratio for the light electric vehicle. An optimal gear ratio for a light electric vehicle may be based on a number of factors including riding habits and riding preferences of an individual rider, a current location along a route from an origin to a destination, a predicted route from an origin to a destination and/or one or more operating parameters of the light electric vehicle.

Accordingly, the present disclosure describes a method for determining an optimal gear ratio for a light electric vehicle. In some examples, the method includes receiving a light electric vehicle use request from a computing device associated with an individual. Using the information included in the use request, profile information of individual is determined. The profile information includes a light electric vehicle riding habit of the individual. The use request may also contain location information of the individual. When the riding habit information and location information is received, a light electric vehicle associated with the location of the individual may be identified. Information about that particular light electric vehicle may also be received. During a use period of the light electric vehicle and using the riding habit of the individual and the light electric vehicle information, an optimal gear ratio for the light electric vehicle is determined. In some examples, the optimal gear ratio is selected from a plurality of different gear ratios of the light electric vehicle. When the optimal gear ratio is determined, an indication of the optimal gear ratio is provided to the light electric vehicle.

Also described is a system having at least one processor and a memory communicatively coupled to the at least one processor. The memory stores instructions that, when executed by the at least one processor, perform operations. In some examples, these operations include receiving a light electric vehicle use request from a computing device associated with an individual. The system may also receive light electric vehicle information from an identified light electric vehicle. The system may also determine a riding habit of the requesting individual. In some examples, the riding habit of the individual is based, at least in part, on one or more previous rides of the individual on light electric vehicles. A determination may be made, based at least in part, on the light electric vehicle information and the riding habit of the individual, of a range of gear ratios of the identified light electric vehicle that the individual can access. An indication of the range of gear ratios may then be provided to the light electric vehicle.

The present disclosure also describes a method for providing a shift notification to a light electric vehicle. The shift notification may be based, at least in part, on light electric vehicle riding habits of the individual. For example, rider profile information associated with an individual may be received. In some examples, the rider profile information includes light electric vehicle riding habits of the individual. Light electric vehicle information for an electric vehicle selected by the individual may also be received. A determination of an optimal gear ratio for the light electric vehicle may then be made. The determination of the optimal gear ratio may be based, at least in part, on the riding habits of the individual and the light electric vehicle information. During a route from an origin to a destination, a shift notification may be provided to the light electric vehicle. The shift notification may be used to prompt the individual to shift from a current gear ratio of the light electric vehicle to the optimal gear ratio.

BRIEF DESCRIPTION OF THE DRAWINGS

Non-limiting and non-exhaustive examples are described with reference to the following Figures.

DETAILED DESCRIPTION

Figure 1:
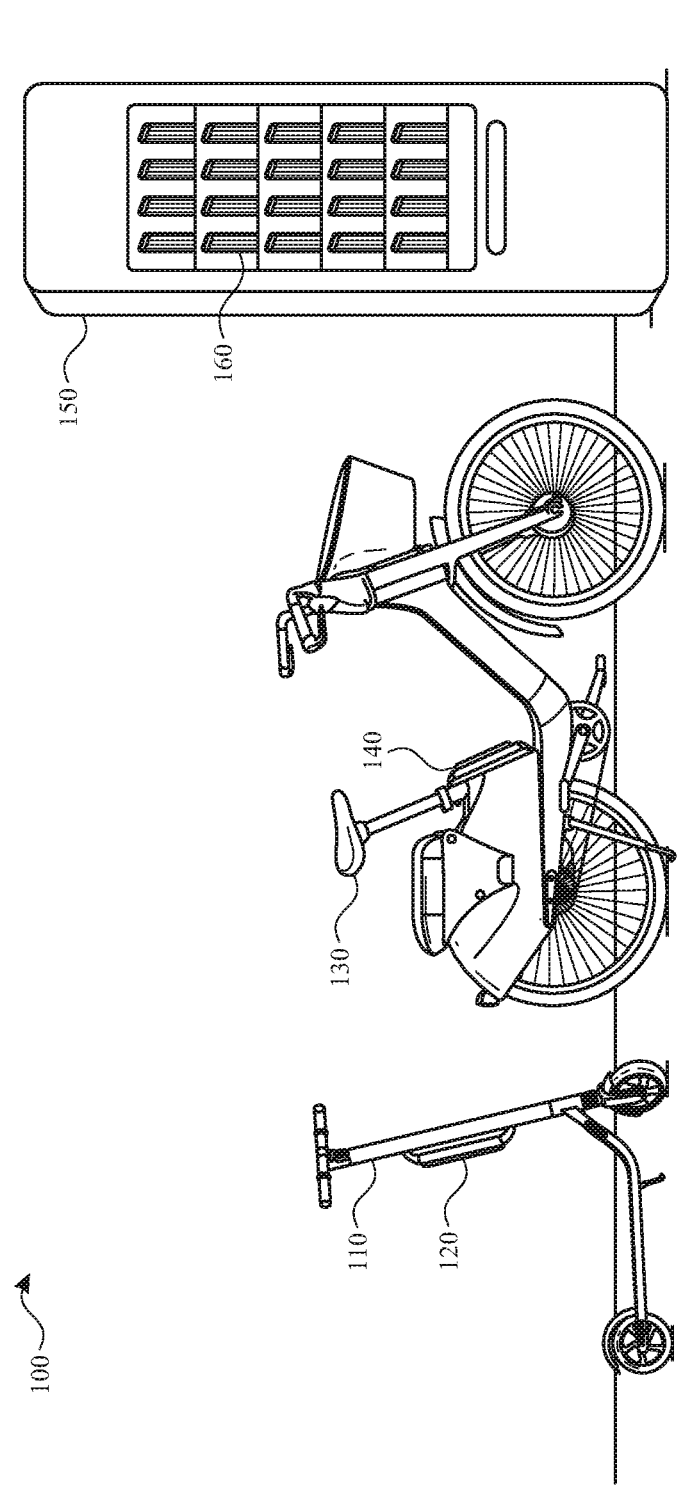
FIG. 1 illustrates a light electric vehicle ridesharing system according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Electric ridesharing vehicles, such as electric assist bicycles and electric scooters (also referred to herein as "electric vehicles" or "light electric vehicles"), are typically available for various individuals to reserve and use for a period of time. However, each individual may have their own particular riding style, riding preferences and/or riding habits. For example, one individual may prefer pedaling the light electric vehicle at a particular cadence, receiving a certain amount of assistance by an electric assist motor of the light electric vehicle and/or traveling at a particular speed. Likewise, another individual may have an entirely different set of riding preferences or habits.

In some examples, the light electric vehicle may have a number of gear ratios available for use. Each gear ratio may enable the individual to achieve a particular speed—either with the individual pedaling at a particular pedaling cadence or without the individual pedaling at a particular pedaling cadence. Additionally, one gear ratio may be more suitable for a particular location along a route when compared to another gear ratio. For example, if one part of a particular route from an origin to a destination has a hill, an individual may prefer to ride up the hill using a lower gear ratio of the light electric vehicle. However, on another relatively flat part of the route, the individual may prefer a higher gear ratio of the light electric vehicle.

Additionally, each light electric vehicle may perform differently depending on certain factors. These factors may include an age of the light electric vehicle, a maintenance history of the light electric vehicle, an amount of remaining charge of a rechargeable battery of the light electric vehicle and so on. Using the information about the light electric vehicle, the system described herein may determine in which gear ratio the light electric vehicle should operate in order to increase an efficiency of the light electric vehicle (e.g., conserve charge of a rechargeable battery).

Although some light electric vehicles in a fleet of light electric vehicles may perform differently than others, it may be important that individual riders have the same or similar riding experience each time a light electric vehicle is ridden. Additionally, in order to reduce the downtime of electric vehicles in a fleet (e.g., due to locating light electric vehicles at a number of different locations, picking up the light electric vehicles and recharging rechargeable batteries of the light electric vehicles) it may be important to maximize the amount of rides and/or distance traveled of each light electric vehicle.

Accordingly, described herein is a light electric vehicle management system that determines an optimal gear ratio for a light electric vehicle. The light electric vehicle management system may then provide an indication of the optimal gear ratio to the light electric vehicle. For example, the optimal gear ratio may be provided to a computing device of the individual. In another example, the optimal gear ratio may be provided to the light electric vehicle and the light electric vehicle may provide a shift indication to the individual. In yet another example, the optimal gear ratio may be provided to an onboard computing device of the light electric vehicle and the computing device may instruct a gearbox of the light electric vehicle to automatically shift the current gear ratio to the optimal gear ratio.

As used herein, the term "optimal gear ratio" means a gear ratio at which an individual riding a light electric vehicle can achieve a desired speed while maintaining and/or achieving a desired cadence and pedaling speed. The term optimal gear ratio may also be a gear ratio that maximizes the distance the light electric vehicle can travel using an amount of power in a rechargeable battery while still considering the desired speed and riding habits (e.g., pedaling cadence) of the individual.

In some examples, the light electric vehicle management system may consider a number of different factors when determining the optimal gear ratio for the light electric vehicle. For example, the light electric vehicle management system may consider the state of charge of a rechargeable battery when determining the optimal gear ratio for the light electric vehicle. That is, a particular gear ratio may be selected as the optimal gear ratio in order to maximize a travel distance and/or efficiency of the light electric vehicle based on the riding habits of the individual and an amount of charge remaining in the rechargeable battery of the light electric vehicle.

The optimal gear ratio may be a single gear ratio or a range of gear ratios. The light electric vehicle management system may also automatically and dynamically update and/or change the optimal gear ratio of the light electric vehicle in real-time or substantially real-time as the light electric vehicle is being ridden by the individual. For example, a first gear ratio may be identified as the optimal gear ratio at a first location along a route from an origin to a destination while a second, different gear ratio may be identified as the optimal gear ratio at a second location along the route.

As briefly explained above, selection or identification of an optimal gear ratio for a light electric vehicle may be based on a number of factors, including riding habits and/or riding preferences of an individual. For example, the light electric vehicle management system may build a riding habit profile of an individual. The information in the riding habit profile may be based, at least in part, on data received about past (or current) light electric vehicle of the individual. This data may be received from a computing device associated with the individual or from the light electric vehicle. Any data that is received is securely stored.

The riding habit profile may include information regarding an anticipated route of the individual, the individual's preferred pedaling cadence, the individual's preferred pedaling speed, the individual's preferred light electric vehicle speed, an amount of power typically consumed by an electric assist motor of the light electric vehicle when the individual is riding the light electric vehicle, how often and when the individual shifts gear ratios, how often and when the individual changes gear ratios along a particular route, how often and when the individual changes gear ratios on different topographies and so on.

As also discussed above, a determination of the optimal gear ratio may be based, at least in part, on an amount of charge remaining in a rechargeable battery of the light electric vehicle or other maintenance status (e.g., tire pressure, tire alignment etc.) of the light electric vehicle. Such a determination may be used to maximize a travel distance of the light electric vehicle based on an amount of charge remaining in the rechargeable battery of the light electric vehicle. For example, if an amount of charge of the rechargeable battery of the light electric vehicle is at seventy-five percent or above, a higher gear ratio may be selected as the optimal gear ratio and the light electric vehicle management system may allow the light electric vehicle to travel at a higher rate of speed. However, if the amount of charge of the rechargeable battery is between fifty percent and seventy-five percent, a lower gear ratio may be selected as the optimal gear ratio and the light electric vehicle management system may restrict the light electric vehicle from reaching its top speed in order to conserve power in the rechargeable battery. Although a specific amount of charge of a rechargeable battery is given in this example, this is for illustrative purposes only.

When the optimal gear ratio is determined, the light electric vehicle management system may provide an indication or notification of the optimal gear ratio to the light electric vehicle. In some examples, the optimal gear ratio may be determined and provided to the light electric vehicle as the light electric vehicle is being ridden by an individual. In some examples, the light electric vehicle may automatically change gear ratios from a current gear ratio to the optimal gear ratio. In other examples, the individual may be notified of the optimal gear ratio. The individual may be notified of the optimal gear in a number of different ways.

For example, the individual may be prompted to change the gear ratio from a current gear ratio to the optimal gear ratio through the use of a tactile or haptic prompt provided by the light electric vehicle (in response to receiving instructions from the light electric vehicle management system). In another example, the individual may be prompted to change from the current gear ratio to the optimal gear ratio by a visual and/or audible notification provided by the light electric vehicle. In yet other examples, the light electric vehicle management system may provide instructions to the light electric vehicle to prevent the individual from accessing one or more gear ratios.

Accordingly, the present disclosure provides a plurality of technical benefits including but not limited to conserving or otherwise extending/improving the battery life of a rechargeable battery of a light electric vehicle, training individual riders of light electric vehicles how to effectively (e.g., when and where along a route) shift gear ratios, generate routes for light electric vehicles based on an anticipated or determined state of charge of a rechargeable battery, among other examples.

These and other features will be described in more detail below with respect to FIG. 1-FIG. 7.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables an individual, using a client application executing on a computing device, to locate, request, and/or reserve (e.g., rent or borrow for a duration of time) one or more light electric vehicles.

In some examples, the network service includes one or more computing systems or servers that are remote from the computing device of the individual and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the individual receives, from the network service over the network communication channel, information about a location of one or more of the light electric vehicles. The location of each of the light electric vehicles can then be provided on a user interface of the client application.

In one example, the user interface of the client application includes a map that displays a determined location of the individual and/or a determined location of the light electric vehicles. In some examples, the determined location of the individual and/or the determined location of the light electric vehicles is based, at least in part, on Global Positioning System (GPS) data Global Navigation Satellite System (GNSS) data (or other location information) received by the network service over the network communication channel.

The user interface of the client application displays the location information of the individual and the light electric vehicles as different icons (or other such representations). Once the location information is displayed, the individual may select an icon representing a type of light electric vehicle (e.g., an icon for an electric scooter 110 or an icon for an electric bicycle 130). The user interface of the client application then generates or determines a route (e.g., provides directions) from the individual's current location to the selected light electric vehicle. Selection of one of the icons may also enable the individual to reserve (e.g., place a hold on) the light electric vehicle (to ensure that the light electric vehicle will be at the determined location when the individual arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every 5 minutes, every 10 minutes, etc.). In yet other examples, the location tracking system may track the location of the light electric vehicle in real-time or substantially real-time when the light electric vehicle is reserved, rented or otherwise used by an individual and may track location information at periodic intervals when the light electric vehicle has been reserved or is otherwise not in use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the individual. This information may include a profile of the individual (e.g., username, contact information, etc.) security credentials of the individual (e.g., a password), historical usage data, payment information and the like. In some examples, an individual may control or otherwise indicate what information and/or what types of information the system can request and/or store. In other examples, an individual may either opt in or opt out of any data collection process described herein. This may include indicating data that can be collected and/or stored by the systems described herein and which data cannot be collected and/or stored by the systems described herein.

The one or more computing systems of the network service may also include a matching system. The matching system receives, manages or otherwise handles various requests from the individual. The requests may include light electric vehicle rental requests and light electric vehicle reservation requests. For example, when a vehicle rental request is received from the client application executing on the individual's computing device, the matching system may communicate with the location tracking system and determine which light electric vehicle should be matched with or otherwise assigned to the requesting individual.

The one or more computing systems of the network service may also include a payment system that processes payment information of the individual. For example, when an individual reserves, rents and/or uses a light electric vehicle, the individual may be charged for the usage based on a duration of use and/or a travel distance. Once the individual has finished using the light electric vehicle (e.g., by arriving at her intended destination, a check-in point, a rechargeable battery kiosk 150, etc.), the payment system may automatically process the payment information of the individual.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gear ratios, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the individual and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the individual. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the individual. When this occurs, the individual may be directed to a rechargeable battery kiosk 150. For example, the network service can transmit data, over one or more networks, to the computing device to cause the computing device to display information about a particular rechargeable battery kiosk 150 to travel to.

When the individual arrives at the rechargeable battery kiosk 150, the individual may exchange the light electric vehicle's current battery with another rechargeable battery housed by the rechargeable battery kiosk 150, thereby enabling the light electric vehicle to continue or resume operation. In some instances, the individual can use the client application executing on the computing device of the individual to locate and/or select a rechargeable battery kiosk 150, receive directions to the rechargeable battery kiosk 150, and initiate a battery swap with the rechargeable battery kiosk 150 when the individual arrives at its location.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when an individual is traveling through the geographic region on a light electric vehicle and wants or needs to exchange the light electric vehicle's current rechargeable battery for one that has more charge, the individual may be directed (e.g., via the client application executing on the individual's computing device) to the rechargeable battery kiosk 150 associated with the geographic region. When the individual arrives at the rechargeable battery kiosk 150, the individual can exchange her current rechargeable battery for one that is fully charged or substantially fully charged. This enables the individual to travel using a light electric vehicle across distances that may otherwise not be possible using the power provided by one charge of a rechargeable battery.

In some examples, the rechargeable battery kiosk 150 comprises a control system that communicates directly or indirectly with a computing device of the individual when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The battery status information can include, but is not limited to, battery charge levels, battery health, an amount of rechargeable batteries currently available at the rechargeable battery kiosk, and/or usage demand statistics.

Figure 2A:
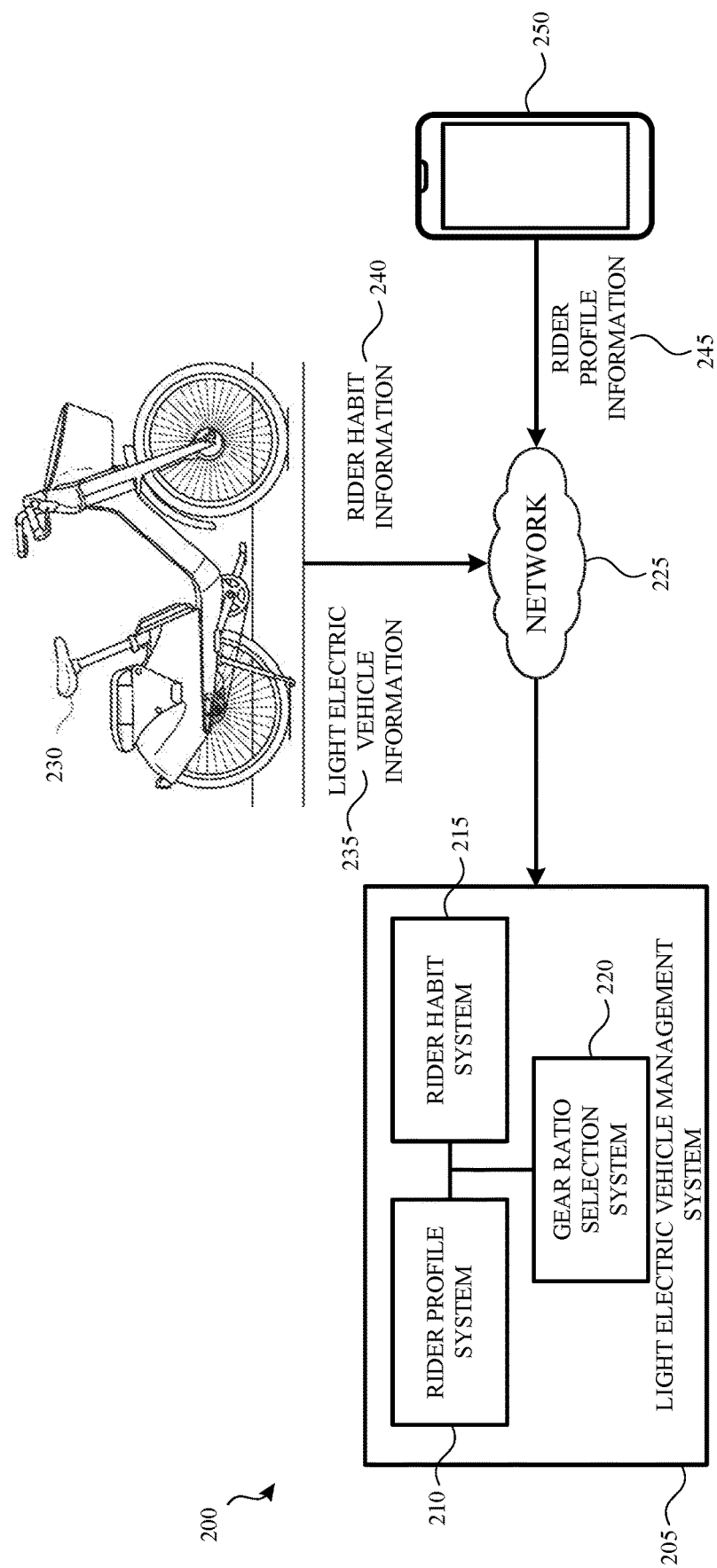
FIG. 2A illustrates a light electric vehicle management system according to an example.
Figure 2B:
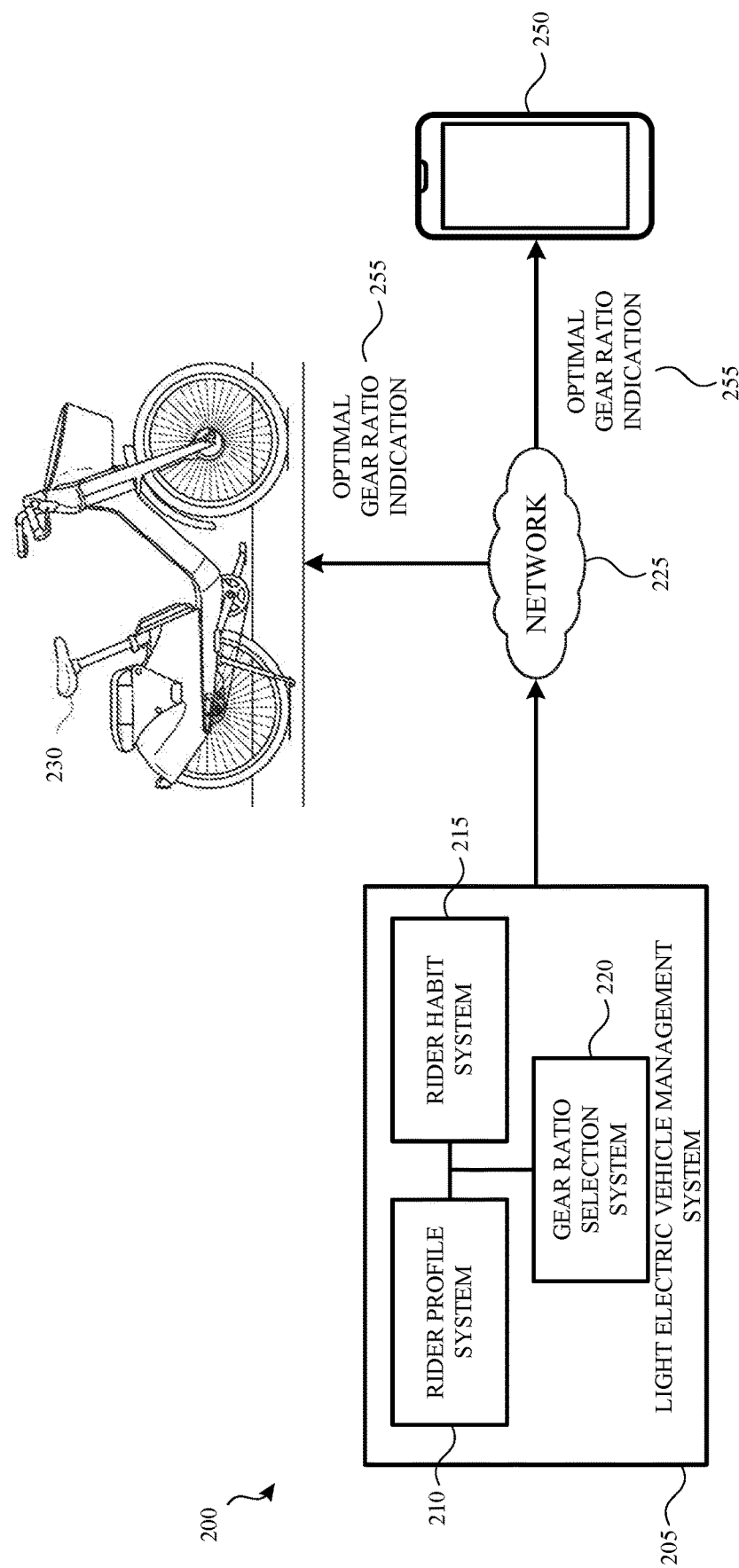
FIG. 2B illustrates how the light electric vehicle management system of FIG. 2A can provide an optimal gear ratio notification to a light electric vehicle and/or a rider of the light electric vehicle.

FIG. 2A illustrates a system 200 for determining an optimal gear ratio for a light electric vehicle 230 according to an example. The system 200 may be used with any number of different light electric vehicles including electric bicycles, electric scooters and so on. The light electric vehicle 230 may have a mechanical transmission with a fixed number of gear ratios. In other examples, the electric vehicle may have a continuously variable transmission. Additionally, although a single light electric vehicle 230 is shown and described with respect to FIG. 2A, the system 200, and more specifically, the light electric vehicle management system 205, may determine an optimal gear ratio and provide an optimal gear ratio notification to a number of different light electric vehicles individually or at the same time or substantially the same time.

As shown in FIG. 2A, the system 200 includes a light electric vehicle management system 205. The light electric vehicle management system 205 may include a rider profile system 210, a rider habit system 215 and a gear ratio selection system 220. In order to determine an optimal gear ratio for a light electric vehicle, the light electric vehicle management system 205 may receive various different types of information from various sources. For example, and as shown in FIG. 2A, the light electric vehicle management system 205 may receive light electric vehicle information 235 and/or rider habit information 240 from a light electric vehicle 230 over a network 225. Additionally, the light electric vehicle management system 205 may receive rider profile information 245 from a computing device 250 over the network 225. As will be explained in more detail below, the light electric vehicle management system 205 may use the received information to determine an optimal gear ratio for the light electric vehicle 230. In some examples, an individual may opt out of providing rider profile information 245 to the light electric vehicle management system 205.

When an individual wants to reserve and use the light electric vehicle 230, the individual may access an application executing on the computing device 250 and submit a reservation request, over the network 225, to the light electric vehicle management system 205. In some examples, the application executing on the computing device 250 may provide rider profile information 245 to the rider profile system 210 of the light electric vehicle management system 205.

The rider profile information 245 may contain profile information about the individual associated with the computing device 250. For example, the rider profile information 245 may contain information about the number of times the individual has reserved and/or used light electric vehicles, one or more routes taken by the individual while using light electric vehicles, the times of day and/or days of the week the individual reserved and/or used light electric vehicles and so on. This information may be used, along with other information, to determine an optimal gear ratio for the light electric vehicle.

For example, the rider profile information 245 may include information that the individual typically reserves a light electric vehicle on Monday, Wednesday and Friday mornings at 7:00 AM. The rider profile information 245 may also indicate that the individual typically reserves the light electric vehicle at or near a particular origin (e.g., near the individual's home) and travels a particular route to a particular destination (e.g., to the individual's work). Likewise, the rider profile information 245 may indicate that the individual typically reserves a light electric vehicle on Monday, Wednesday and Friday evenings at 6:00 PM and takes a particular route from an origin (e.g., the individual's work) to a destination (e.g., the individual's home).

The rider profile information 245 may be provided to the rider profile system 210 each time a light electric vehicle 230 is reserved and/or used by the individual. In other examples, the rider profile system 210 may use sign-in credentials received from the computing device 250 and associated with the individual to access stored rider profile information 245. The stored rider profile information 245 may be updated as new or additional information (e.g., additional routes taken by the individual) is received from the computing device 250.

Although the above example indicates that route and other information is received from a computing device 250, in some instances, the rider profile system 210 may receive route information, reservation information and/or origin/destination information of the individual from the light electric vehicle 230. For example, the light electric vehicle 230 may provide GPS data or other location information to the light electric vehicle management system 205. The light electric vehicle management system 205 may store the received information in the rider profile system 210 associated with the individual that reserved and is riding the light electric vehicle 230.

Using the rider profile information 245, the light electric vehicle management system 205 may be able to accurately predict, determine and/or anticipate a route of travel of the individual. In some examples, this includes determining or anticipating different topographies along a route or an anticipated route. For example, if the individual reserves the light electric vehicle 230 at 7:00 AM on Monday morning, the light electric vehicle management system 205 may determine, based on rider profile information 245, that the individual is going to work. The light electric vehicle management system 205 may also determine, using rider profile information 245, that the individual will most likely take a particular route on the way to work.

Using this information, the light electric vehicle management system 205 may determine one or more optimal gear ratios for the light electric vehicle 230 along the route. For example, if the route contains a hill, the light electric vehicle management system 205 may determine that a lower gear ratio should be used by the light electric vehicle 230 in order to maintain a speed and/or pedal cadence desired by the individual riding the light electric vehicle 230. In other examples, the light electric vehicle management system may determine one or more optimal gear ratios in order to conserve an amount of power in a rechargeable battery of the light electric vehicle 230.

The optimal gear ratio may also be determined or selected in order to cause the individual to operate the light electric vehicle 230 more efficiently. For example, if the individual primarily relies on the electric assist motor of the light electric vehicle 230 while riding, the optimal gear ratio may be a gear ratio that restricts a top speed of the light electric vehicle. In other examples, the optimal gear ratio may be selected in order to encourage the individual to use the pedals more frequently and rely less on the electric assist motor of the light electric vehicle 230.

In some examples, the rider profile information 245 may include or otherwise be associated with rider habit information 240. As such, when the light electric vehicle management system 205 receives the rider profile information 245, the rider profile information 245 may be provided to the rider profile system 210 and the rider habit information 240 may be provided to the rider habit system 215. In other examples, rider habit information 240 may be provided to the rider habit system 215 by the light electric vehicle 230 over the network 225 as the individual rides the light electric vehicle 230.

Rider habit information 240 may be provided to the rider habit system 215 in real-time or substantially real-time. Thus, the light electric vehicle management system 205 may dynamically provide an optimal gear ratio notification to the light electric vehicle 230 in real-time or substantially real-time as will be explained in greater detail herein.

The rider habit information 240 may include information received from one or more sensors associated with the light electric vehicle 230. For example, the sensor information may include or otherwise provide information about a pedaling cadence of the individual as the individual rides the light electric vehicle 230 and/or an average or typical speed at which the individual rides the light electric vehicle 230. The sensor information may also provide information as to whether the individual is standing or sitting while pedaling the light electric vehicle 230 and provide an optimal gear ratio according to the determination.

The rider habit information 240 may also include information about an average amount of power of a rechargeable battery used by the light electric vehicle 230 when the individual is riding the light electric vehicle 230 (e.g., how much the individual pedals the light electric vehicle 230 versus relying on the electric assist motor of the light electric vehicle 230), gear ratio shifting habits (e.g., how often, when and where along a route the individual shifts gear ratios) of the individual and so on. Rider habit information 240 that is securely stored in the rider habit system 215 may be based, at least in part, riding habits of the individual collected from one or more previous rides. As additional rider habit information 240 is received, the rider habit information 240 stored in the rider habit system 215 may be updated.

The rider habit information 240 may be used in conjunction with the rider profile information 245 to determine whether the individual has different riding habits based on, for example, time of the day, day of the week, location, anticipated route and so on. For example, an individual may have a first set of riding habits during the week as the individual commutes from home to work. However, the individual may have a second set of riding habits on the weekend. Each of these different riding habits may be associated with a different optimal gear ratio.

The rider profile information 245 may also include weight and/or payload data associated with the individual that is riding the light electric vehicle 230. In some examples, the weight information may be used, either alone or in combination with other information discussed herein (e.g., rider habit information 240), to select an optimal gear ratio for the light electric vehicle 230. The weight information may be provided by an individual. In other examples, the weight information may be detected by one or more sensors associated with the light electric vehicle 230.

In some examples, the weigh information may be used as input to adjust or control a shifting schedule of the light electric vehicle 230. For example, the weight information may be used as an input to a motor controller and/or a gearbox of an electric assist motor of the light electric vehicle 230. Thus, when the light electric vehicle management system 205 determines that the light electric vehicle 230 is approaching a hill, the light electric vehicle management system 205 (using the gear ratio selection system 220) may determine an optimal gear ratio for the light electric vehicle 230 to assist the individual in riding up the hill. The optimal gear ratio may then be provided to the motor controller. In another example, the light electric vehicle management system 205 may use the weight information to determine an optimal gear ratio that enables an individual to accelerate more quickly along different parts of a route.

The light electric vehicle management system 205 may also use the weight information to optimize an efficiency of the light electric vehicle 230. For example, using the weight information, the light electric vehicle management system 205 may determine an optimal gear ratio and/or an amount of power that should be provided by the electric assist motor of the light electric vehicle 230 such that power in a rechargeable battery of the light electric vehicle 230 consumes a less power. The gear ratio and/or power consumption may be tailored to various individuals based on one or more of their rider profile information 245, rider habit information 240, riding preferences, route preferences and weight.

In yet other examples, the weight information may be used to determine an optimal gear ratio as an individual is braking or otherwise stopping the light electric vehicle 230. For example, if an individual is riding a light electric vehicle 230 downhill or is approaching a traffic signal, the light electric vehicle management system 205, along with the gear ratio selection system 220, may determine an optimal gear ratio for the light electric vehicle 230 in order to assist the individual in maintaining a safe speed (e.g., while travelling downhill) and/or approaching/stopping at the traffic signal.

In some examples, the light electric vehicle 230 may be equipped or otherwise configured with a regenerative braking system in which energy is extracted from various components or parts of the light electric vehicle 230 as the brakes of the light electric vehicle 230 are applied. The extracted energy may be stored and/or reused by the rechargeable battery of the light electric vehicle which may increase the range of the light electric vehicle 230.

The light electric vehicle management system 205 may also use information from a weight sensor to determine whether the individual is standing while pedaling or sitting on a seat of the light electric vehicle 230 while pedaling. For example, the seat of the light electric vehicle 230 may be associated with a weight sensor that is used to detect the position of the individual. When the position of the individual on the light electric vehicle 230 is determined, an optimal gear ratio may be selected by the gear ratio selection system 220 based on a determined preferred or optimal rider cadence (e.g., determined by rider profile information 245 and/or rider habit information 240).

For example, an individual may prefer a lower gear ratio while standing and pedaling the pedals of the light electric vehicle 230 and a higher gear ratio while sitting on the seat and pedaling the pedals of the light electric vehicle 230. In yet another example, the light electric vehicle management system 205 may provide an indication to the individual and/or the light electric vehicle 230 that a particular gear ratio should be selected. The light electric vehicle management system 205 may also provide an indication as to whether the individual should stand and pedal or sit and pedal based on one or more operating conditions of the light electric vehicle 230 and/or based on the topography of a particular route or part of a route. For example, the individual may be prompted to stand and pedal the light electric vehicle 230 if the individual is approaching a hill or is on a hill.

The light electric vehicle 230 may also include a weight sensor to determine a payload associated with the individual. For example, the individual may have cargo that is placed in a basket, bag, or other container associated or integrated with the light electric vehicle 230. The payload information may be used, either alone or in combination with the weight information of the individual, to determine an optimal gear ratio for the light electric vehicle 230 such as described above.

The light electric vehicle 230 may also provide light electric vehicle information 235 to the light electric vehicle management system 205. In some examples, the gear ratio selection system 220 may use the light electric vehicle information 235, either alone, or in combination with, the rider habit information 240 and/or the rider profile information 245 to dynamically determine (and provide an indication of) an optimal gear ratio for the light electric vehicle 230.

For example, the gear ratio selection system 220 may use stored rider habit information 240 in the rider habit system 215 to determine that the individual reserving the light electric vehicle 230 typically pedals at a particular pedaling cadence or pedals with a particular frequency and travels at a particular speed. Accordingly, the gear ratio selection system 220 may dynamically determine that the optimal gear ratio for the individual is a first gear ratio. Once the optimal gear ratio is determined, an optimal gear ratio indication 255 (FIG. 2B) may be provided to the light electric vehicle 230 and/or the computing device 250 over the network 225. The optimal gear ratio may be selected to assist the individual in maintaining her desired speed and pedaling cadence along a route.

In some examples, the optimal gear ratio indication 255 (FIG. 2B) may include or otherwise be associated with a gear ratio shift prompt that prompts the individual to shift either up or down depending on the current gear ratio of the light electric vehicle. For example, the optimal gear ratio indication 255 may include a visual notification (e.g., a blinking light), an audible notification and/or a tactile notification (e.g., a vibration on the handlebar of the light electric vehicle 230). In other examples, the optimal gear ratio indication 255 may be sent to a computing device that is associated or otherwise integrated with the light electric vehicle 230. When the optimal gear ratio indication 255 is received by the computing device, the computing device may instruct a gearbox of the light electric vehicle 230 to change gear ratios from the current gear ratio to the optimal gear ratio automatically.

The optimal gear ratio indication 255 (FIG. 2B) may be provided to the light electric vehicle 230 and/or the computing device 250 in real-time or substantially real-time. Additionally, a determination of what the optimal gear ratio is may also change. For example, the gear ratio selection system 220 may determine, based on rider habit information 240, that the optimal gear ratio for the individual on a particular part of a route (e.g., a flat or relatively flat part of the route) is a first gear ratio. However, if the light electric vehicle management system 205 determines that the individual is approaching a hill or is riding up a hill (e.g., using rider profile information 245, rider habit information 240 and/or location information provided by the computing device 250 and/or the light electric vehicle 230), the gear ratio selection system 220 may determine that the optimal gear ratio is a second gear ratio (e.g., a lower gear ratio). As such, the gear ratio selection system 220 may provide one or more optimal gear ratio indications 255 to the light electric vehicle 230 and/or the computing device 250 such as previously described.

If the light electric vehicle management system 205 determines that the light electric vehicle 230 is no longer on the hill (e.g., using rider profile information 245, rider habit information 240 and/or location information provided by the computing device 250 and/or the light electric vehicle 230) the gear ratio selection system 220 may provide another optimal gear ratio indication 255 (FIG. 2B) to the light electric vehicle 230 and/or the computing device 250 indicating that the individual should switch from the second gear ratio back to the first gear ratio.

In some examples, the optimal gear ratio indication 255 (FIG. 2B) may be associated with a time constraint or time threshold. For example, the optimal gear ratio indication 255 may be provided by the gear ratio selection system 220 to the light electric vehicle 230 and/or the computing device 250 only after a threshold amount of time passed since the individual and/or the light electric vehicle 230 switched gear ratios (e.g., with or without being prompted by the optimal gear ratio indication). In other examples, the time threshold may be associated with current location information of the light electric vehicle 230, rider profile information 245 and/or rider habit information 240. For example, if the individual just finished ascending a hill in the second gear ratio, the optimal gear ratio indication 255 indicating that the individual (or the light electric vehicle 230) should shift to the first gear ratio may be provided to the light electric vehicle 230. The optimal gear ratio indication 255 may be provided to the light electric vehicle 230 after a set amount of time (e.g., five seconds) has passed, until the individual has traveled a threshold distance, pedaled over a threshold amount of rotations etc.

In some examples, the optimal gear ratio may be selected in order to conserve power in a rechargeable battery of the light electric vehicle. For example, the light electric vehicle management system 205 may determine that an anticipated route of the individual has one or more hills. The light electric vehicle management system 205 may also determine that the individual typically relies heavily on the electric assist motor of the light electric vehicle 230 when ascending the hill. In order to conserve battery power, the light electric vehicle management system 205 may select a lower gear ratio as the optimal gear ratio when the individual is riding on a relatively flat part of the route (e.g., either before or after ascending the hill). Thus, although riding up the hill may consume more power, that consumption may be at least partially offset by selecting the lower gear ratio as the optimal gear ratio along the flatter parts of the route.

In yet another example, the light electric vehicle management system 205 may generate or suggest an alternate route that the individual should take. In an effort to encourage individuals to conserve battery power in the rechargeable battery, the light electric vehicle management system 205 may offer one or more incentives to the individual. For example, if the individual takes an alternate route or operates the light electric vehicle 230 in a gear ratio that consumes less battery power when compared to a higher gear ratio, an incentive (e.g., a discount on future reservations of light electric vehicles) may be provided to the computing device 250 of the individual. In such examples, the light electric vehicle management system 205 may track the operating parameters and/or location of the light electric vehicle 230 to ensure the individual is following the parameters set forth in the incentive.

As briefly discussed above, the optimal gear ratio for the light electric vehicle 230 may be based on a combination of information including light electric vehicle information 235, rider habit information 240 and/or rider profile information 245. In one example, state of charge information of a rechargeable battery of the light electric vehicle 230 (or other light electric vehicle information 235 such as maintenance status, operating status, efficiency ratings etc.) may be used with rider habit information 240 and/or rider profile information 245 to determine an optimal gear ratio for the light electric vehicle 230.

For example, if the light electric vehicle information 235 indicates that a state of charge of a rechargeable battery is below a threshold (e.g., twenty percent), the gear ratio selection system 220 may base the determination of the optimal gear ratio on how to get the most distance from the remaining charge of the rechargeable battery. As such, the optimal gear ratio may be a lower gear ratio that consumes less energy from the rechargeable battery when compared to a higher gear ratio.

However, and continuing with the example, the light electric vehicle management system 205 may determine that a state of charge of a rechargeable battery is below a threshold (e.g., twenty percent) and may also determine, using rider profile information 245, that an anticipated route of the individual is only one mile. Further, the light electric vehicle management system 205 may determine that the anticipated route does not include any hills. As such, the gear ratio selection system 220 may determine that one of the mid-range gear ratios of the light electric vehicle 230 is the optimal gear ratio. The optimal gear ratio indication 255 (FIG. 2B) may then be provided to the light electric vehicle 230. However, if the light electric vehicle management system 205 determines (e.g., based on received location information and/or rider habit information) that the individual is deviating from the anticipated route, the gear ratio selection system 220 may determine a new optimal gear ratio and provide an updated optimal gear ratio indication 255 to the light electric vehicle 230 and/or the computing device 250 in order to maximize the travel distance of the light electric vehicle 230 with the remaining battery power in the rechargeable battery.

In some examples, the light electric vehicle information 235 may be provided by one or more sensors associated with the light electric vehicle 230. For example, the light electric vehicle 230 may include a tire pressure sensor that provides information about the current tire pressure of one or more tires of the light electric vehicle 230. In another example, the light electric vehicle 230 may include a tire alignment sensor that provides information as to whether one or more tires of the light electric vehicle 230 are aligned properly. In yet another example, the light electric vehicle 230 may include an image sensor that captures still and/or live images about the light electric vehicle 230 and/or the environment/route in which the light electric vehicle 230 is operating. As the sensor information is received, the light electric vehicle management system 205 may determine an optimal gear ratio for the light electric vehicle 230 such as will be described in more detail below.

For example, if the light electric vehicle 230 is associated with or otherwise includes an image sensor, the image sensor may be used to detect that the light electric vehicle 230 is approaching (or is currently on) a hill. Once this information is received, the light electric vehicle management system 205 may analyze the captured image and determine the slope or grade of the hill. This information may be used by the gear ratio selection system 220 to determine an optimal gear ratio to enable the light electric vehicle 230 to travel up the hill prior to the light electric vehicle 230 hitting the incline of the hill. The optimal gear ratio (e.g., optimal gear ratio indication 255 (FIG. 2B)) may then be provided to the light electric vehicle 230.

The optimal gear ratio may improve rider comfort and safety. For example, the optimal gear ratio may be one that allows the light electric vehicle 230 to use more power in an electric assist motor while requiring the individual to exert less energy pedaling the light electric vehicle 230 up the hill. Additionally, the individual may be able to maintain her current speed and/or ensure she has enough power and/or speed to make it up the hill.

In another example, the image sensor may detect stop signs, stop lights and/or other traffic signs/signals. As this information is received and analyzed, the gear ratio selection system 220 may prompt the individual or otherwise signal the light electric vehicle 230 to shift back to a lower gear ratio (e.g., the first gear ratio) to make starting and/or stopping the light electric vehicle 230 more comfortable and/or faster.

In yet another example, the image sensor may capture or otherwise detect posted speed limits along various routes and/or in certain locations. As the speed limits are detected and/or determined, the gear ratio selection system 220 may prevent the light electric vehicle 230 from accessing or otherwise shifting into higher gear ratios, thereby limiting (or dynamically changing) a top speed of the light electric vehicle 230. In other examples, the gear ratio selection system 220 may cause the light electric vehicle 230 to shift into a lower gear ratio to help ensure the light electric vehicle is within the posted or otherwise determined speed limit.

The image sensor may also be used to detect an environment of a route and/or features of a particular route through which the light electric vehicle 230 is traveling. As the environment or features of the route are detected, the gear ratio selection system 220 may change a gear ratio shifting schedule of the light electric vehicle 230. For example, if the image sensor detects that the light electric vehicle 230 is traveling on an open road, the gear ratio selection system 220 may optimize the gear ratio by recommending the light electric vehicle 230 use a higher gear ratio for higher and/or more consistent speeds.

In another example, the image sensor may detect that the light electric vehicle 230 is operating in a congested urban environment. As such, the gear ratio selection system 220 may determine the optimal gear ratio is one in which the light electric vehicle 230 can be more responsive to frequent starts, stops and/or acceleration (e.g., to avoid obstacles). In yet another example, the image sensor may be used to determine or otherwise detect that the light electric vehicle 230 is operating on a recreational bike path. As such, the gear ratio selection system 220 may optimize shifting and gear ratios for more casual and recreational riding.

In yet another example, the image sensor may be used to detect potentially dangerous conditions (e.g., ice, flooding, sand, rough terrain etc.) along a route or in a particular environment. As this information is received by the light electric vehicle management system 205, the gear ratio selection system 220 may adjust the optimal gear ratio to allow for slower speeds while increasing stability and control of the light electric vehicle 230.

In some examples, the light electric vehicle management system 205 may also determine a route for the individual based on the determined optimal gear ratio and the other received information (e.g., the rider habit information 240, light electric vehicle information 235 and/or rider profile information 245). For example, if the light electric vehicle management system 205 determines that the state of charge of the rechargeable battery of the light electric vehicle 230 is below a threshold, the light electric vehicle management system 205 may determine a location of a rechargeable battery kiosk (e.g., rechargeable battery kiosk(s) 150 (FIG. 1)) along or near an anticipated route or anticipated destination of the individual. The light electric vehicle management system 205 may then generate a route that causes the individual to pass the rechargeable battery kiosk and provide that route to the computing device 250. Additionally, the light electric vehicle management system 205 may also determine an optimal gear ratio to ensure the rechargeable battery of the light electric vehicle 230 has enough power to reach the rechargeable battery kiosk.

In some examples, the individual may be notified of the generated route and may be provided with an incentive to exchange the rechargeable battery of the light electric vehicle 230 with one contained in the rechargeable battery kiosk. Once the rechargeable battery has been swapped, the gear ratio selection system 220 may determine a new optimal gear ratio for the light electric vehicle 230.

In some examples, the light electric vehicle information 235 may also be used to limit gear ratios an individual may access. For example, if the light electric vehicle information 235 indicates that a state of charge of a rechargeable battery is below a threshold (e.g., twenty percent), the gear ratio selection system 220 may restrict the speed at which the individual can travel using the electric assist motor of the light electric vehicle 230 or otherwise prevent the individual from accessing gear ratios that would allow the individual to travel at those speeds and drain the power in the rechargeable battery more quickly.

Although many examples are given, the light electric vehicle management system 205 may be able to build a rider model that is unique to each individual that accesses the system 200. As discussed above, the rider model may be based on rider habit information 240 obtained during an individual's current ride on a light electric vehicle 230 and/or on one or more previous rides. Additionally, the model may be used to help the individual operate the light electric vehicle 230 more efficiently. In other examples, the model may be used to help ensure the light electric vehicle 230 is operating as efficiently as possible (e.g., when the light electric vehicle 230 is configured to automatically shift gear ratios upon receipt of the optimal gear ratio indication 255). As individuals operate the light electric vehicles 230 more efficiently, the range per charge of rechargeable batteries of light electric vehicles 230 may increase. As such, a frequency of downtime of light electric vehicles (e.g., due to recharging rechargeable batteries) may decrease.

In some examples, an individual may select a riding profile and the optimal gear ratio may be determined based, at least in part, on the selected riding profile. For example, if the individual reserves a light electric vehicle in order to ride to work, a first riding profile may be selected. The first riding profile may be a profile in which higher gear ratios may be selected as optimal gear ratios. Thus, the individual may rely more heavily on the electric assist motor to obtain higher speeds. However, on the weekend, the individual may want to select a different riding profile in which the optimal gear ratio is selected from lower gear ratios. As such, the individual may rely more on pedaling the light electric vehicle to achieve a desired speed. In yet other examples, the individual may be allowed to select a riding profile and associated optimal gear ratio based on a destination or route selected by the individual.

Figure 3:
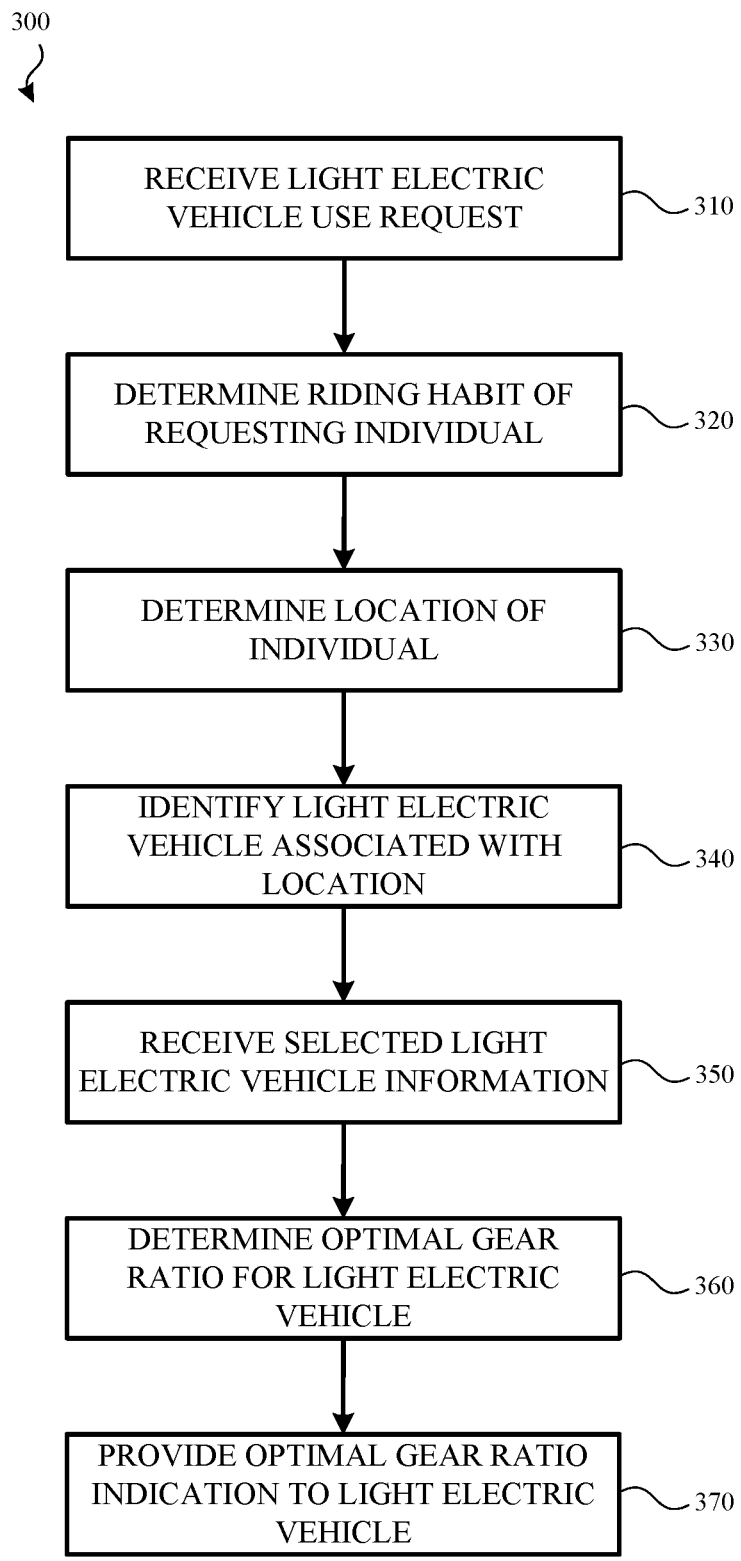
FIG. 3 illustrates a method for determining an optimal gear ratio for a light electric vehicle according to an example.

FIG. 3 illustrates a method 300 for determining an optimal gear ratio for a light electric vehicle according to an example. The method 300 may be performed by one or more of the systems shown and described with respect to FIG. 2A and FIG. 2B.

Method 300 begins when a light electric vehicle use request is received (310) by a system, such as, for example a light electric vehicle management system. In some examples, the use request is provided by an application executing on a computing device associated with an individual that wants to reserve and use a particular light electric vehicle. The use request may contain profile information associated with the individual. The profile information may include past routes taken by the individual, past origins and destinations of those routes, and so on.

The light electric vehicle management system may also receive or determine (320) riding habits of the individual that is associated with or otherwise submitted the light electric vehicle use request. In some examples, the riding habits may be included or otherwise associated with the light electric vehicle use request. In other examples, the profile information received as part of the use request may allow the light electric vehicle management system to identify previously received and stored riding habits of the requesting individual. In yet other examples, riding habits of the individual may be received by the system in real-time or substantially real-time as the individual is riding the light electric vehicle.

Riding habits of the individual may be used to build a rider profile for the individual. The rider profile may include information about how the individual likes to ride the light electric vehicle and may include information about how often and when the individual switches gear ratios, typical riding speeds of the individual, a pedaling cadence of the individual, a pedaling frequency of the individual, an amount of charge of a rechargeable battery of the light electric vehicle consumed by the individual as the individual rides the light electric vehicle, how often and when the individual uses an electric assist motor of the light electric vehicle, etc.

The light electric vehicle management system may also determine (330) a location of the individual. The location information may be based on GPS data or other location-based data received from a computing device associated with the individual. The location information of the individual may be included or otherwise associated with the use request. The location information may be used to identify (340) one or more light electric vehicles in an area associated with the location of the individual. In some examples, the location of the one or more light electric vehicles may be provided on a user interface of the individual's computing device. The individual may then select one of the identified light electric vehicles.

In other examples, the individual may approach a light electric vehicle on the street, access a light electric vehicle use application on the computing device and reserve the light electric vehicle by scanning an identifier (e.g., a QR code) associated with the light electric vehicle. In such examples, the use request, profile information and riding habits of the individual may be provided to or identified by the light electric vehicle management system at that time.

Once a particular light electric vehicle is selected by the individual, the light electric vehicle management system may receive (350) or otherwise determine light electric vehicle information of the selected light electric vehicle. In some examples, this information may include a current state of charge of a rechargeable battery of the light electric vehicle, a maintenance history of the light electric vehicle, an efficiency rating of the light electric vehicle and so on.

Once this information is received, the light electric vehicle management system may determine (360) an optimal gear ratio for the light electric vehicle. The optimal gear ratio may be determined in real-time or substantially real-time and may be based on the rider profile information, the riding habits of the individual and/or the light electric vehicle information discussed above.

In some examples, the determination of the optimal gear ratio is predictive in nature. For example, if the topography along a particular route changes, the light electric vehicle management system may determine, using received location information, that the individual is approaching the change in topography (e.g., the individual is approaching a hill). As such, the light electric vehicle management system may determine an optimal gear ratio for the light electric vehicle prior to the light electric vehicle reaching the hill to help ensure the light electric vehicle has enough power and/or speed to make it up the hill.

As discussed above, the determination of the optimal gear ratio may be based, at least in part on, riding habits of the individual. For example, if the riding habits of the individual indicate that the individual typically relies heavily on the electric assist motor when riding the light electric vehicle, the optimal gear ratio for riding up the hill may be a low gear ratio. However, if the riding habits of the individual indicate the individual typically pedals when on a hill, the optimal gear ratio may be a higher gear ratio.

When the optimal gear ratio is determined, the electric vehicle management system provides (370) an indication or notification of the optimal gear ratio to the light electric vehicle. In some examples, when the optimal gear ratio is received, the light electric vehicle may automatically switch the gear ratio from the current gear ratio to the optimal gear ratio. In other examples, the individual riding the light electric vehicle may be prompted to switch from the current gear ratio to the optimal gear ratio. In some examples, the prompt provided to the individual may be a visual notification (e.g., a flashing light provided on a handle bar of the light electric vehicle), a haptic notification, an audible notification or a combination thereof.

In some examples, a determination of the optimal gear ratio may change over the course of a ride or route. For example and as discussed above, if the individual is approaching a hill, the optimal gear ratio for riding up a hill may be different than the optimal gear ratio when riding down a hill. As such, the optimal gear ratio notification may be provided to the light electric vehicle anytime an optimal gear ratio is determined based on received information (e.g., location information, state of charge information, changes in riding habits, etc.). Continuing with the example above, if the individual is approaching a hill, the optimal gear ratio indication may be provided to the light electric vehicle prior to the light electric vehicle reaching the hill to help ensure the light electric vehicle has enough power to travel up the hill.

Figure 4:
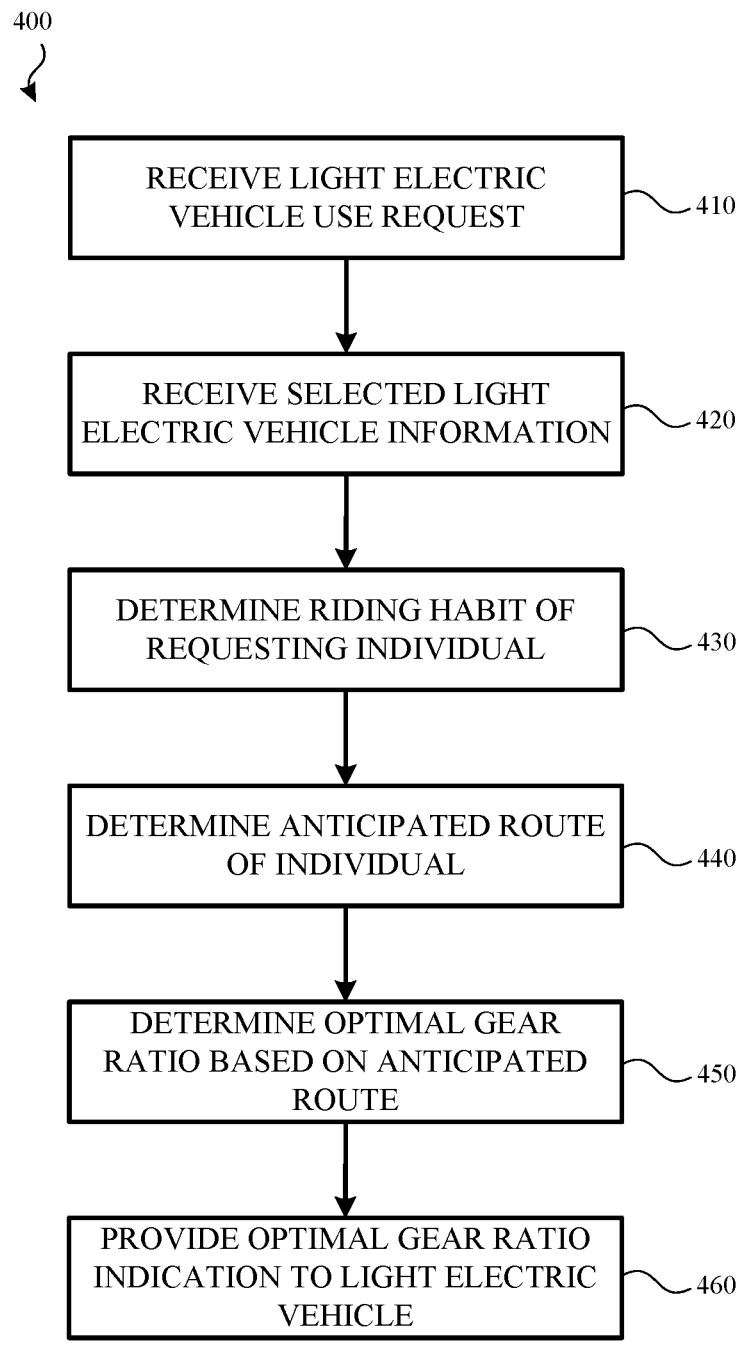
FIG. 4 illustrates a method for determining an optimal gear ratio for a light electric vehicle based on an anticipated route of the light electric vehicle according to an example.

FIG. 4 illustrates a method 400 for determining an optimal gear ratio for a light electric vehicle based on an anticipated route of the light electric vehicle according to an example. The method 400 may be performed by one or more of the systems shown and described with respect to FIG. 2A and FIG. 2B.

Method 400 begins when a system, such as, for example, a light electric vehicle management system, receives (410) a light electric vehicle use request. The request may be received in similar manner to any of those described herein. When the light electric vehicle use request is received, the light electric vehicle management system receives (420) or otherwise determines information associated with the selected or identified light electric vehicle. Riding habits of the requesting individual may also be determined (430) or received such as described above.

The light electric vehicle management system may then determine (440) an anticipated route of the individual. The anticipated route may be based on information contained in the light electric vehicle use request and/or riding habits of the requesting individual. For example, the light electric vehicle use request may contain profile information associated with the individual. The profile information may include information about typical starting locations of the individual, typical ending locations of the individual and one or more routes the individual typically takes between those starting locations and ending locations. The anticipated route may also be based on times of the day and/or days of the week that the individual submitted the use request.

Once the anticipated route has been determined, the light electric vehicle management system may determine (450) an optimal gear ratio for the light electric vehicle. The optimal gear ratio may be based on a combination of the light electric vehicle information, the riding habits of the requesting individual and the anticipated route. As previously discussed, as the light electric vehicle management system receives additional information (e.g., state of charge information from a rechargeable battery of the light electric vehicle, updated route and/or location information of the light electric vehicle, changes to riding habits of the individual, etc.), the determination of the optimal gear ratio may change.

When the optimal gear ratio is determined, an indication of the optimal gear ratio may be provided (460) to the light electric vehicle. The indication may cause the light electric vehicle to automatically switch gear ratios from a current gear ratio to the optimal gear ratio. In other example, indication may be an optical indication (e.g., a flashing light), an audible notification, and/or a haptic notification that prompts the individual riding the light electric vehicle to change gear ratios.

Figure 5:
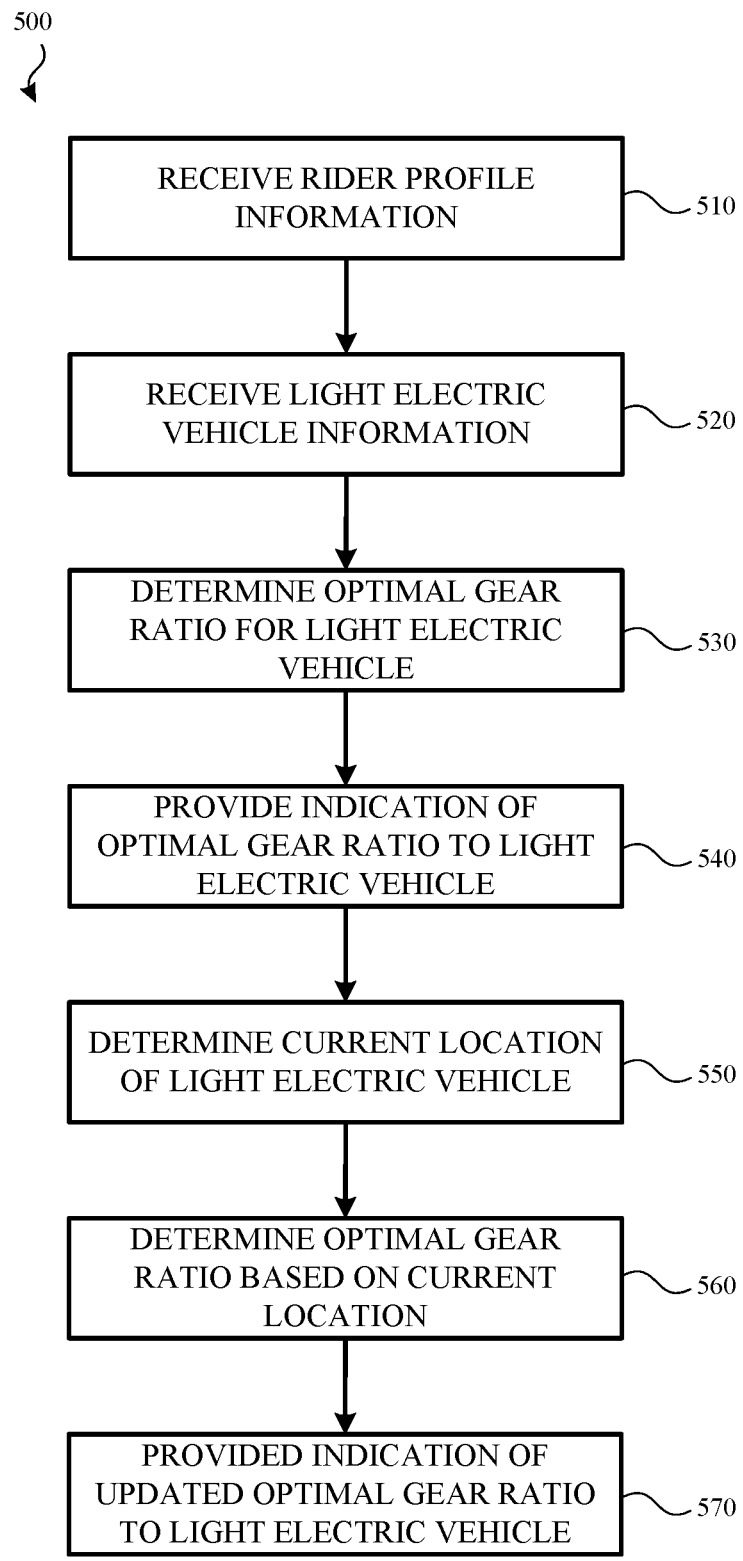
FIG. 5 illustrates a method for determining an optimal gear ratio for a light electric vehicle based on a current location of the light electric vehicle according to an example.

As briefly discussed above, the determination of an optimal gear ratio for a light electric vehicle may be made in real-time or substantially real-time based on a current location of the light electric vehicle. Accordingly, FIG. 5 illustrates a method 500 for determining an optimal gear ratio for a light electric vehicle based on a current location of the light electric vehicle according to an example. The method 500 may be performed by one or more of the systems shown and described with respect to FIG. 2A and FIG. 2B.

As with the other methods described herein, method 500 begins when rider profile information is received (510) or otherwise determined by the light electric vehicle management system (e.g., as part of a received light electric vehicle use request). The light electric vehicle management system may also receive (520) information about the light electric vehicle. Using this information, along with riding habits of the individual, the light electric vehicle management system may determine (530) an optimal gear ratio for the light electric vehicle and provide (540) an indication of the optimal gear ratio to the light electric vehicle.

During the course of a ride between an origin and a destination, the light electric vehicle (or a computing device associated with the individual riding the light electric vehicle) may provide (550) its current location information to the light electric vehicle management system. Using this information, the light electric vehicle management system may determine whether the light electric vehicle is approaching and/or is currently riding in an area with changes in its topography.

If the light electric vehicle is approaching and/or is currently riding in such an area, the light electric vehicle management system may determine (560) an optimal gear ratio for the electric vehicle based on the change in topography. In some examples, the determination of the optimal gear ratio may be based on the previously received and/or stored information including rider habit information and/or light electric vehicle information. An indication of the updated optimal gear ratio may then be provided (570) to the light electric vehicle.

Figure 6:
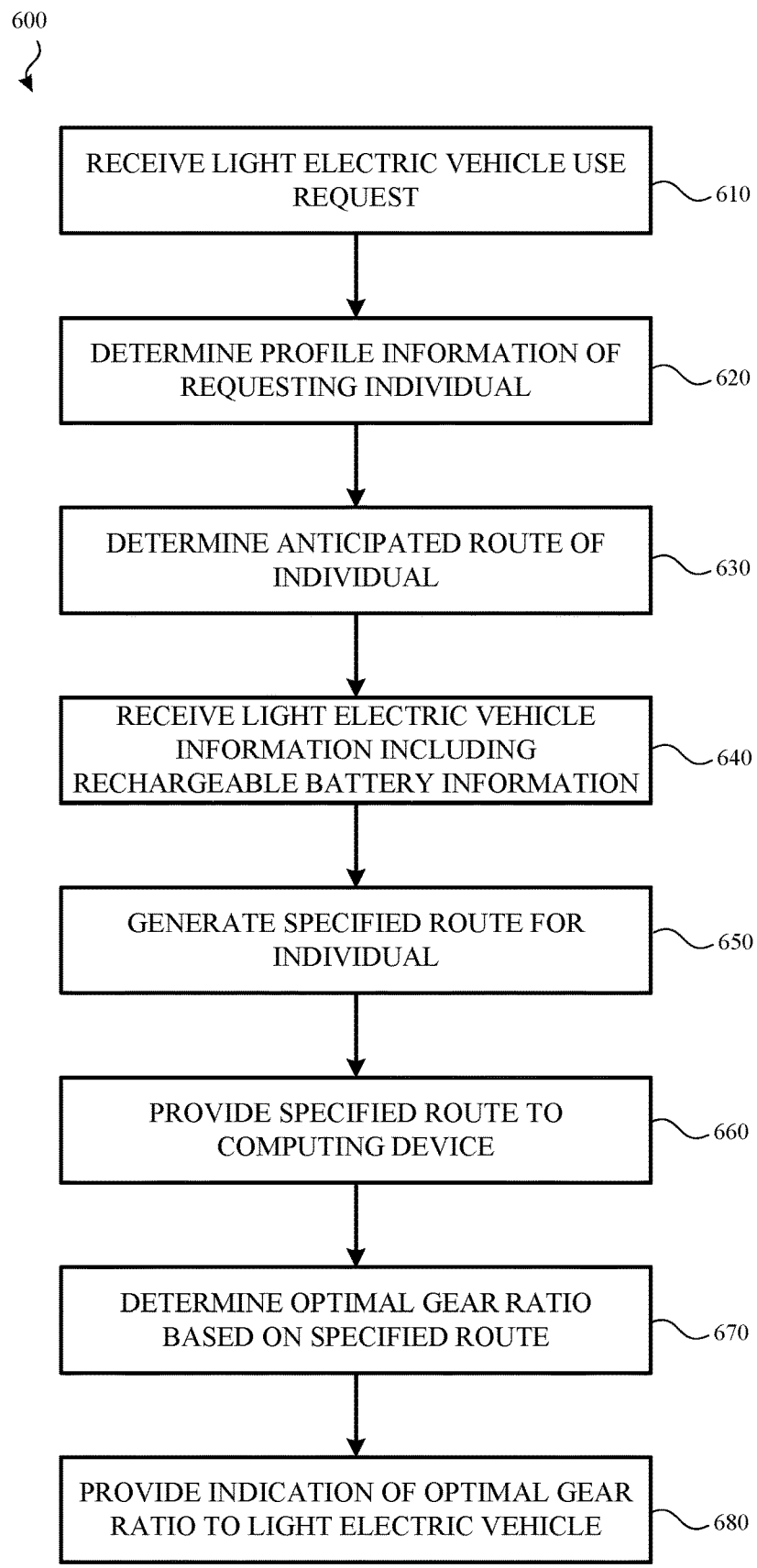
FIG. 6 illustrates a method for determining an optimal gear ratio for a light electric vehicle for a specified or determined route of the light electric vehicle according to an example.

In some examples, the light electric vehicle management system may be configured to specify a particular route for the individual based, at least in part, on the riding habits of the individual, a specified riding preference of the individual and/or received information about the light electric vehicle on which the individual is riding. Accordingly, FIG. 6 illustrates a method 600 for determining an optimal gear ratio for a light electric vehicle for a specified or determined route of the light electric vehicle according to an example. The method 600 may be performed by one or more of the systems shown and described with respect to FIG. 2A and FIG. 2B.

Method 600 begins when a light electric vehicle use request is received (610). Using the information contained in the light electric vehicle use request, the light electric vehicle management system may determine (620) profile information of the requesting individual. The profile information may allow the light electric vehicle management system to determine (630) an anticipated route of the individual such as previously described.

In some examples, the light electric vehicle management system may receive (640) or otherwise determine light electric vehicle information. The light electric vehicle information may include rechargeable battery information such as, an amount of charge remaining in the rechargeable battery and/or a battery efficiency rating of the electric vehicle. Although rechargeable battery information is specifically mentioned, the light electric vehicle management system may receive various kinds of operating parameter information from the light electric vehicle including maintenance history information, tire pressure information, tire alignment information and so on.

The light electric vehicle management system may then determine, based on a combination of some or all of the received information, whether the light electric vehicle can or should travel the entire distance of the anticipated route. For example, if the rechargeable battery information indicates that the rechargeable battery is below a charge threshold and the riding habits of the individual indicate that the light electric vehicle will not have enough battery power to run an electric assist motor of the light electric vehicle along the entire route (e.g., because the route has hills and/or the individual does not pedal very often and primarily relies on the electric assist motor), the light electric vehicle management system may generate (650) a specified route for the individual. The generated route may then be provided (660) to a computing device associated with the individual.

The generated route and determined optimal gear ratio (explained in more detail below) may be a route and gear ratio that will prolong the use of the rechargeable battery. For example, the generated route and optimal gear ratio may avoid hills that the individual usually rides on. In other examples, the generated route may be a route that takes the individual to a rechargeable battery kiosk, another light electric vehicle (e.g., one with more power in the rechargeable battery) or a maintenance facility. When the individual arrives at the rechargeable battery kiosk or maintenance facility, the individual may use the rechargeable battery kiosk to swap rechargeable batteries or may exchange the current light electric vehicle for another at a maintenance facility.

In some examples, an incentive for taking the generated route may be provided to the computing device of the individual. The individual may choose to accept the generated route using the optimal gear ratio and the incentive. However, if the individual does not want to take the generated route and/or use the light electric vehicle in the determined optimal gear ratio, the individual may be notified that the selected light electric vehicle may not have enough power to get the individual to her anticipated destination based on the anticipated route and known riding habits. As such, the light electric vehicle management system may direct the individual to another light electric vehicle.

When the route has been generated, the light electric vehicle management system may determine (670) an optimal gear ratio for the light electric vehicle as it travels along the route. The light electric vehicle management system may then provide (680) an indication of the optimal gear ratio to the light electric vehicle. In some examples, this may include enabling a computing device and/or gearbox of the light electric vehicle to prevent the individual from accessing gear ratios that use more power of the rechargeable battery when compared with other gear ratios of the light electric vehicle. For example, if the individual agrees to take the specified route, the light electric vehicle management system may send instructions to the computing device and/or a gear box of the light electric vehicle to prevent a shifting mechanism of the light electric vehicle from actuating and/or sending a shift signal to the light electric vehicle.

Figure 7:
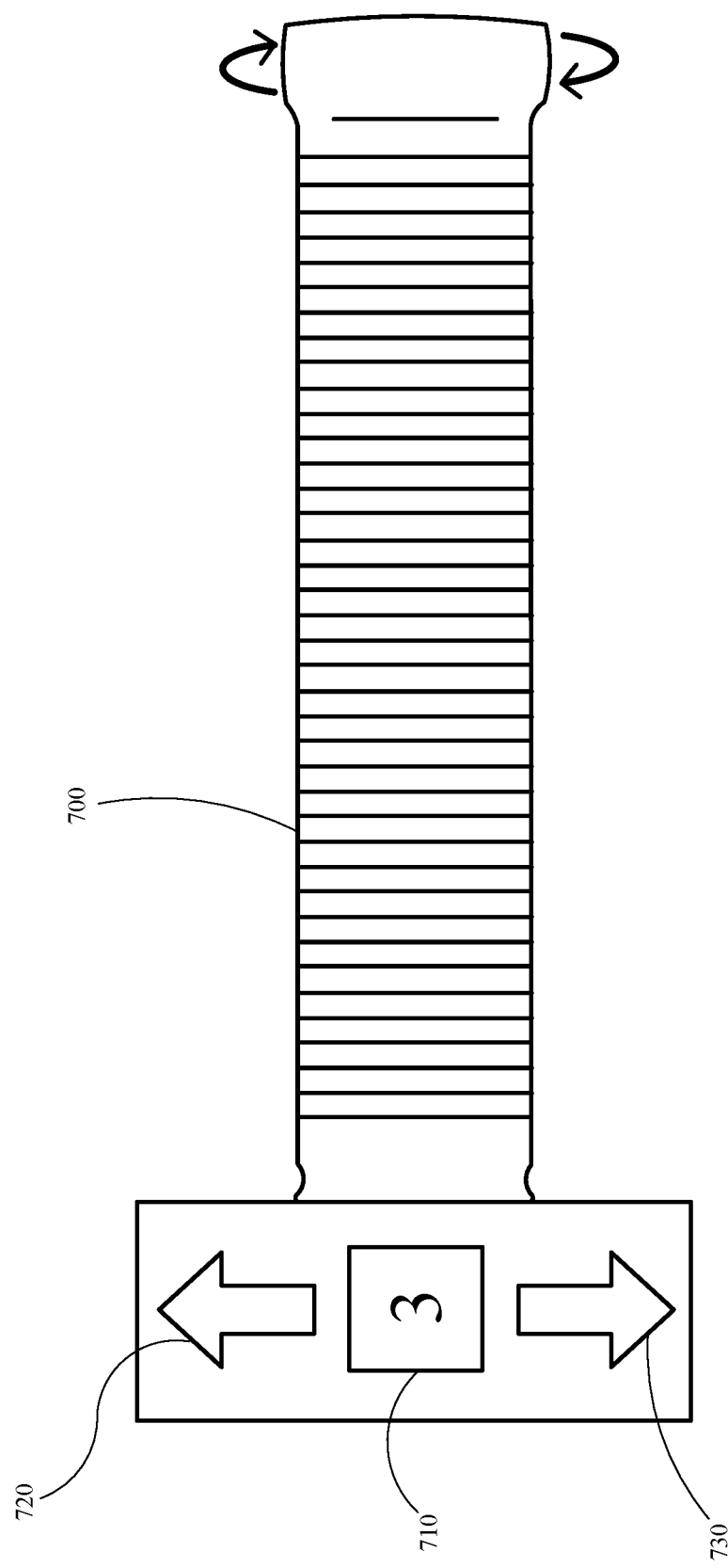
FIG. 7 illustrates an example handle for a light electric vehicle according to an example.

FIG. 7 illustrates an example handle 700 for a light electric vehicle according to an example. The handle 700 may be part of the light electric vehicles described herein and may be used to provide visual, audio, and/or haptic notifications to an individual when a shift indication is received from a light electric vehicle management system.

For example and as shown in FIG. 7, the handle 700 may include a current gear ratio indicator 710 that displays the current gear ratio of the light electric vehicle. When a shift indication is received, shift notification 720 and/or shift notification 730 may be illuminated to prompt the individual to shift gear ratios either up or down. In some examples, the handle 700 of the light electric vehicle may be twisted in the direction of the directional arrows to shift gear ratios as indicated. Although shift notification 720 and shift notification 730 are shown as visual indicators, the handle 700 may also be configured to provide haptic notifications and/or audible notifications in lieu of or in additional to the visual notifications.

Figure 8:
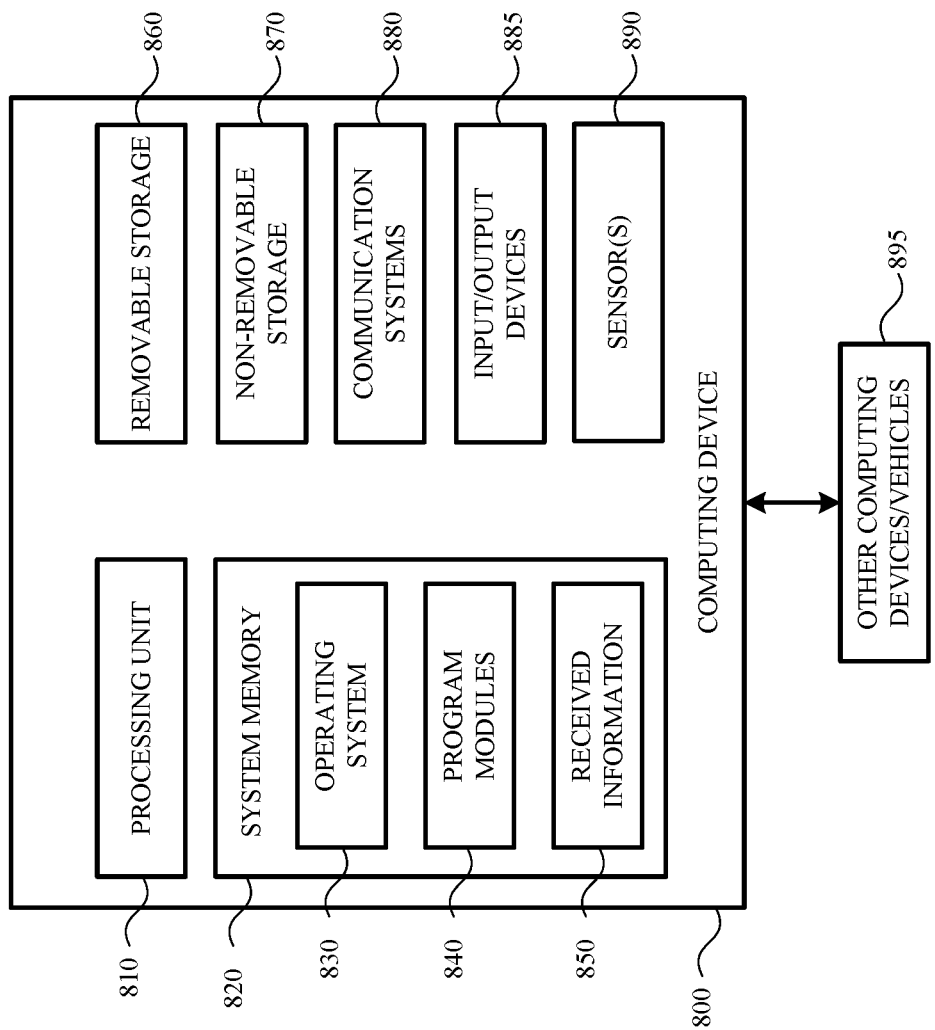
FIG. 8 illustrates an example computing device according to an example.

FIG. 8 is a system diagram of a computing device 800 according to an example. The computing device 800 may be integrated with or associated with a light electric vehicle, such as light electric vehicle 230 shown and described with respect to FIG. 2A and FIG. 2B. The computing device 800 may also be associated or otherwise integrated with the various systems shown and described with respect to FIG. 1, FIG. 2A and FIG. 2B. As shown in FIG. 8, the physical components (e.g., hardware) of the computing are illustrated and these physical components may be used to practice the various aspects of the present disclosure.

The computing device 800 may include at least one processing unit 810 and a system memory 820. The system memory 820 may include, but is not limited to, volatile storage (e.g., random access memory), non-volatile storage (e.g., read-only memory), flash memory, or any combination of such memories. The system memory 820 may also include an operating system 830 that control the operation of the computing device 800 and one or more program modules 840. The program modules 840 may be responsible for gathering or determining rider profile information, light electric vehicle information, riding habit information and so on. The memory may also store this received/determined information 850 or otherwise provide access to this information.

The computing device 800 may also have additional features or functionality. For example, the computing device 800 may include additional data storage devices (e.g., removable and/or non-removable storage devices) such as, for example, magnetic disks, optical disks, or tape. These additional storage devices are labeled as a removable storage 860 and a non-removable storage 870.

A number of different program modules and data files may be stored in the system memory 820. While executing on the processing unit 810, the program modules 840 may perform the various processes described above.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 800 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the light electric vehicle and/or in any other circuits or systems.

The computing device 800 may include one or more communication systems 880 that enable the light electric vehicle to communicate with rechargeable batteries, other computing devices/vehicles 895 (e.g., remote computing devices, remote computing devices associated with other light electric vehicles), a network service and the like. Examples of communication systems 880 include, but are not limited to, radio frequency (RF) transmitter, receiver, and/or transceiver circuitry, a Controller Area Network (CAN) bus, a universal serial bus (USB), parallel, and/or serial ports.

The computing device 800 may also have one or more input devices and/or one or more output devices shown as input/output devices 885. These input/output devices 885 may include a keyboard, a sound or voice input device, a touch, force and/or swipe input device, a display, speakers, etc. The aforementioned devices are examples and others may be used.

The computing device 800 may also include one or more sensors 890. The sensors may be used to detect or otherwise provide information about the operating condition of the light electric vehicle. In other examples, the sensors 890 may provide information about a light electric vehicle to which the computing device 800 is associated. For example, the sensors 890 may include a weight sensor, a tire pressure sensor, an image sensor, a speed sensor, a tire alignment sensor, a rechargeable battery sensor and so on.

The term computer-readable media as used herein may include computer storage media. Computer storage media may include volatile and nonvolatile, removable and non-removable media implemented in any method or technology for storage of information, such as computer readable instructions, data structures, or program modules.

The system memory 820, the removable storage 860, and the non-removable storage 870 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In light of the above examples described herein describe a method, comprising: receiving a light electric vehicle use request from a computing device associated with an individual; determining, based at least in part, on the light electric vehicle use request, profile information associated with the individual, the profile information including a riding habit of the individual; determining a location of the individual; identifying a light electric vehicle associated with the location of the individual; receiving light electric vehicle information associated with the light electric vehicle; determining, during a use period of the light electric vehicle and using the riding habit of the individual and the light electric vehicle information, a determined optimal gear ratio for the light electric vehicle, the optimal gear ratio being selected from a plurality of different gear ratios of the light electric vehicle; and providing an indication of the optimal gear ratio to the light electric vehicle. In some examples, providing an indication of the optimal gear ratio comprises transmitting a shift notification to the light electric vehicle. In some examples, the shift notification comprises a haptic notification. In some examples, the shift notification is a visual indication. In some examples, the riding habit of the individual comprises one or more of: a pedaling cadence of the individual; an average amount of power of a rechargeable battery used by the light electric vehicle when the individual is riding the light electric vehicle; or shifting habits of the individual. In some examples, the method also includes determining, based at least in part, on the profile information associated with the individual, an anticipated route of travel of the light electric vehicle. In some examples, the optimal gear ratio is based, at least in part, on the anticipated route of travel. In some examples, the optimal gear ratio is based, at least in part, on a specific location within the anticipated route of travel.

Other examples describe a system, comprising: at least one processor; and a memory communicatively coupled to the at least one processor and storing instructions that, when executed by the at least one processor, perform operations. The operations may include receiving a light electric vehicle use request from a computing device associated with an individual; receiving light electric vehicle information from an identified light electric vehicle; determining a riding habit of the individual, the riding habit of the individual being based, at least in part, on one or more previous rides of the individual on light electric vehicles; determining, based at least in part, on the light electric vehicle information and the riding habit of the individual, a range of gear ratios of the identified light electric vehicle that the individual can access; and providing an indication of the range of gear ratios to the identified light electric vehicle. In some examples, the instructions may include instructions for determining, based at least in part, on location information of the individual and profile information of the individual, an anticipated route of travel of the individual. In some examples, the instructions may include instructions for updating the range of gear ratios of the light electric vehicle based, at least in part, on the anticipated route of travel of the individual. In some examples, the instructions may include instructions for providing, in substantially real time, a gear ratio shift notification to the identified light electric vehicle based, at least in part, on an identified location of the light electric vehicle. In some examples, the light electric vehicle information comprises a charge status of a rechargeable battery associated with the light electric vehicle. In some examples, the instructions may include instructions for restricting access to one or more gear ratios that are outside of the range of gear ratios.

Other examples describe a method, comprising: receiving rider profile information associated with an individual, the rider profile information comprising light electric vehicle riding habits of the individual; receiving light electric vehicle information for a light electric vehicle selected by the individual; determining, based at least in part, on the riding habits of the individual and the light electric vehicle information, an optimal gear ratio for the light electric vehicle; and during a route from an origin to a destination, providing a shift notification to the light electric vehicle, the shift notification being used to prompt the individual to shift from a current gear ratio of the light electric vehicle to the optimal gear ratio. In some examples, the optimal gear ratio is based, at least in part, on a current location of the light electric vehicle along the route from the origin to the destination. In some examples, the optimal gear ratio is based, at least in part, on a state of charge of a rechargeable battery associated with the light electric vehicle. In some examples, the optimal gear ratio is based, at least in part, on a desired ride profile selected by the individual. In some examples, the light electric vehicle information includes performance metrics of the light electric vehicle based on a current state of charge of a rechargeable battery associated with the light electric vehicle. In some examples, the optimal gear ratio is based, at least in part, on an anticipated route from the origin to the destination.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method, comprising:
receiving a light electric vehicle use request from a computing device associated with an individual, the use request indicating a user intent to reserve or use the light electric vehicle;
determining, based at least in part, on the light electric vehicle use request, profile information associated with the individual, the profile information including a riding habit of the individual and being received from the computing device;
determining a location of the individual;
identifying a light electric vehicle associated with the location of the individual;
receiving light electric vehicle information associated with the light electric vehicle, the light electric vehicle information including at least one of (i) a current state of charge of a rechargeable battery of the light electrical vehicle, (ii) a maintenance history of the light electrical vehicle, or (iii) an efficiency rating of the light electrical vehicle;
determining, during a use period of the light electric vehicle and using the riding habit of the individual and the light electric vehicle information, a determined optimal gear ratio for the light electric vehicle, the optimal gear ratio being selected from a plurality of different gear ratios of the light electric vehicle; and providing an indication of the optimal gear ratio to the light electric vehicle.

2. The method of claim 1, wherein providing an indication of the optimal gear ratio comprises transmitting a shift notification to the light electric vehicle.

3. The method of claim 2, wherein the shift notification comprises a haptic notification.

4. The method of claim 2, wherein the shift notification is a visual indication.

5. The method of claim 1, wherein the riding habit of the individual comprises one or more of:
  a pedaling cadence of the individual;
  an average amount of power of a rechargeable battery used by the light electric vehicle when the individual is riding the light electric vehicle; or
  shifting habits of the individual.

6. The method of claim 1, further comprising determining, based at least in part, on the profile information associated with the individual, an anticipated route of travel of the light electric vehicle.

7. The method of claim 6, wherein the optimal gear ratio is based, at least in part, on the anticipated route of travel.

8. The method of claim 6, wherein the optimal gear ratio is based, at least in part, on a specific location within the anticipated route of travel.

9. A system, comprising:
  at least one processor; and
  a memory communicatively coupled to the at least one processor and storing instructions that, when executed by the at least one processor, perform operations, comprising:
    receiving a light electric vehicle use request from a computing device associated with an individual, the use request indicating a user intent to reserve or use the light electric vehicle;
    receiving light electric vehicle information from an identified light electric vehicle, the light electric vehicle information including at least one of (i) a current state of charge of a rechargeable battery of the light electrical vehicle, (ii) a maintenance history of the light electrical vehicle, or (iii) an efficiency rating of the light electrical vehicle;
    determining a riding habit of the individual, the riding habit of the individual being based, at least in part, on one or more previous rides of the individual on light electric vehicles;
    determining, based at least in part, on the light electric vehicle information and the riding habit of the individual, a range of gear ratios of the identified light electric vehicle that the individual can access; and
    providing an indication of the range of gear ratios to the identified light electric vehicle.

10. The system of claim 9, further comprising instructions for determining, based at least in part, on location information of the individual and profile information of the individual, an anticipated route of travel of the individual.

11. The system of claim 10, further comprising instructions for updating the range of gear ratios of the light electric vehicle based, at least in part, on the anticipated route of travel of the individual.

12. The system of claim 10, wherein the vehicle further comprising instructions for providing, in substantially real time, a gear ratio shift notification to the identified light electric vehicle based, at least in part, on an identified location of the light electric vehicle.

13. The system of claim 9, wherein the light electric vehicle information comprises a charge status of a rechargeable battery associated with the light electric vehicle.

14. The system of claim 9, further comprising instructions for restricting access to one or more gear ratios that are outside of the range of gear ratios.

15. A method, comprising:
  receiving, from a computing device of an individual, rider profile information associated with the individual, the rider profile information comprising light electric vehicle riding habits of the individual;
  receiving light electric vehicle information for a light electric vehicle selected by the individual, the light electric vehicle information including at least one of (i) a current state of charge of a rechargeable battery of the light electrical vehicle, (ii) a maintenance history of the light electrical vehicle, or (iii) an efficiency rating of the light electrical vehicle;
  determining, based at least in part, on the riding habits of the individual and the light electric vehicle information, an optimal gear ratio for the light electric vehicle; and
  during a route from an origin to a destination, providing a shift notification to the light electric vehicle, the shift notification being used to prompt the individual to shift from a current gear ratio of the light electric vehicle to the optimal gear ratio.

16. The method of claim 15, wherein the optimal gear ratio is based, at least in part, on a current location of the light electric vehicle along the route from the origin to the destination.

17. The method of claim 15, wherein the optimal gear ratio is based, at least in part, on a desired ride profile selected by the individual.

18. The method of claim 15, wherein the light electric vehicle information includes performance metrics of the light electric vehicle based on a current state of charge of a rechargeable battery associated with the light electric vehicle.

19. The method of claim 15, wherein the optimal gear ratio is based, at least in part, on an anticipated route from the origin to the destination.

20. The method of claim 15, wherein the efficiency rating of the light electrical vehicle is based, at least in part, on weight information for the individual.

* * * * *